(12) United States Patent
Durling

(10) Patent No.: US 7,934,903 B2
(45) Date of Patent: May 3, 2011

(54) FLUID RELEASE VALVE

(75) Inventor: Christopher J. Durling, Bristol (GB)

(73) Assignee: Rolls-Royce plc, London (GB)

( * ) Notice: Subject to any disclaimer, the term of this patent is extended or adjusted under 35 U.S.C. 154(b) by 117 days.

(21) Appl. No.: 12/585,094

(22) Filed: Sep. 3, 2009

(65) Prior Publication Data

US 2010/0150697 A1    Jun. 17, 2010

(30) Foreign Application Priority Data

Dec. 12, 2008   (GB) ................................. 0822630.0

(51) Int. Cl.
*F01B 31/18* (2006.01)
(52) U.S. Cl. ..................................... 415/169.2; 137/854
(58) Field of Classification Search .................... 415/24, 415/25, 26, 169.1, 169.2, 232; 137/854
See application file for complete search history.

(56) References Cited

U.S. PATENT DOCUMENTS

| | | | | |
|---|---|---|---|---|
| 2,098,885 A | * | 11/1937 | Safford | ........................ 137/853 |
| 2,225,395 A | | 12/1940 | Young | |
| 3,608,834 A | * | 9/1971 | MacLaren | ..................... 239/571 |
| 4,538,508 A | * | 9/1985 | Ballard | ......................... 454/361 |
| 5,027,784 A | | 7/1991 | Osawa et al. | |
| 5,067,449 A | | 11/1991 | Bonde | |
| 6,755,025 B2 | * | 6/2004 | Eleftheriou et al. | ............ 60/795 |
| 2007/0157970 A1 | | 7/2007 | Horng et al. | |
| 2010/0115964 A1 | * | 5/2010 | Kirby | .............................. 60/785 |

FOREIGN PATENT DOCUMENTS

| | | |
|---|---|---|
| GB | 676181 | 7/1952 |
| GB | 2 176 407 A | 12/1986 |
| JP | U 62-104079 | 7/1987 |

\* cited by examiner

*Primary Examiner* — Edward Look
*Assistant Examiner* — Ryan H Ellis
(74) *Attorney, Agent, or Firm* — Oliff & Berridge, PLC

(57) ABSTRACT

Fluid release apparatus (26) for the release of fluid from the interior of a rotating and/or pressurized body (16;18;102; 104), the apparatus comprising a core member (28) having a chamber wall (44) disposed thereabout so as to define an open chamber (30) about said core member. The apparatus further comprises a chamber closure (48) mounted about said core member (28), said closure being resiliently deformable between an at rest state in which the closure contacts the chamber wall (44) and an actuated state in which the closure is spaced there-from, wherein the chamber has an aperture (32;35;55) for receiving liquid phase fluid from the interior of said rotating body. Upon build up of sufficient liquid in said chamber (30) the closure (48) moves to said actuated state so as to release liquid from the interior of the body.

17 Claims, 3 Drawing Sheets

FLUID RELEASE VALVE

BACKGROUND OF THE INVENTION

The present invention relates to fluid release apparatus and more particularly, although not exclusively, to a valve for releasing unwanted fluid build-up from an operational portion of a machine.

The description of the present invention proceeds with reference to rotating machinery, such as, for example, gas turbines. It is known in the art to make allowance for the escape of unwanted liquid from the interior of a compressor drum within a gas turbine. Unwanted liquid may gather for a number of reasons, including malfunction or failure of one or more seals or else the ingress of water from outside of the engine.

During operation, the rotating compressor drives air into the combustor downstream and the compressor drum is maintained at an elevated pressure. A compressor rotor configuration typically comprises a plurality of discs, each having a set of rotor blades mounted thereto.

In a conventional turbine compressor, it is known to provide axial drainage holes in the discs of the compressor drum so as to allow for the escape of liquid from the interior of the compressor. Axially oriented drainage passages in the form of inter-disc holes convey the liquid to be expelled via an exit drainage opening at a radially outermost portion of the drum. The centrifugal force acting on the liquid in the compressor drum serves, at least in part, to drive the unwanted liquid to the final exit drainage points.

The exit drainage opening connects to an area of lower pressure such that in normal engine operation, there is typically a constant leakage of high pressure air through the final exit drainage hole. Whilst the flow of air in this manner encourages the passage of liquid along the drainage path, the ultimate leakage of this air at the drainage point represents an unwanted loss of efficiency to the system.

SUMMARY OF THE INVENTION

It is an aim of the present invention to provide a device for releasing a first fluid from the interior of a rotating body whilst mitigating the problem of loss of further fluids there-from.

According to one aspect of the present invention there is provided fluid release apparatus arranged for the release of fluid from the interior of a rotating body, the apparatus comprising a chamber wall disposed about an aperture in the rotating body so as to define an open chamber about said core member, and a chamber closure being resiliently deformable between an at rest state in which the closure contacts the chamber wall and an actuated state in which the closure is spaced there-from, wherein the chamber is arranged to receive liquid phase fluid from the interior of said rotating body such that upon build up of sufficient liquid in said chamber the closure moves to said actuated state so as to release liquid from said rotating body under centrifugal force.

The rotating body may be maintained at an elevated pressure. In one embodiment, the fluid release apparatus takes the form of a device which is arranged for location in a flow path between a region of relatively higher pressure in the interior of the rotating body and a region of relatively lower pressure outside of said body.

The chamber may be arranged to receive both liquid and gas phase fluids from the interior of the rotating body. The fluid release device may provide the benefit of releasing fluid of one phase in preference to another. Preferably the device allows for release of liquid phase fluid in preference to gas phase fluid.

Typically the closure returns to its at rest state after release of some or all of the liquid in the chamber. The closure may be formed of a spring material and may take the form of a disk spring.

The apparatus may comprise a core member, which may be mounted to an external facing wall of the rotating body. The core member may be located in the aperture of the rotating body. The core member may be shaped to define a flow path between the interior of the rotating body and the chamber.

In one embodiment, the closure is fixed to or integral with the core member. The closure may extend radially outward from the core member. The closure may be substantially circular in plan. In one embodiment the closure may be generally annular or disc-shaped.

The chamber wall may surround the core member and may be curved in plan. The chamber wall may be circular in plan.

The chamber aperture may be provided in the base of the chamber. The chamber wall and base may be integrally formed. The base may be locatable against an outer surface of a wall of the rotating body.

The core member may have one or more ducts therein to allow for passage of fluid there-through. The core member may have a duct arranged to be aligned with an opening in the rotating body. The core member may be received within the aperture in the chamber such that fluid from the body enters the chamber via said core member. The core member may have a main duct with one or more ports depending outwardly there-from for passage of fluid from the inside of the core member into the chamber.

The chamber wall may define a first chamber and the device may comprise one or more formations within the first chamber defining a second chamber in fluid communication with said first chamber. The one or more formations may comprise an internal chamber wall about the core member. The internal wall may depend from the base of the first chamber or the closure.

The internal wall may have one or more ports therein for communication between the first and second chambers. Such ports may take the form of slots. The angular alignment and/or spacing of the ports in the internal wall may be in-line or offset from the ports in the core member. This facilitates the assembly of the device since steps do not need to be taken to ensure the slots 56 and the ports 55 are aligned for use. In addition, the presence of liquid in the inner chamber 54 may help prevent flow of air into the device and thus reduce any unwanted leakage of gas.

The internal volume of the second chamber may be less than that of the first chamber. The second chamber may be contained within the first chamber. The first and second chamber may be arranged about a common centre. The second chamber may be curved or circular in plan.

According to a preferred embodiment, the closure has an aperture shaped to allow insertion of the core member there-through. The core member and/or closure member may have fixing formations thereon. The fixing formations may comprise a threaded section. The closure may be fixedly held in place about the core member by fixing means such as a nut.

The closure may comprise a collar portion for location about the core member and closure portion depending outwardly there-from. The collar may be shaped so as to define the second chamber about the core member. The collar may have a circumferential groove or recess on its inner surface which defines the second chamber.

The closure portion may have first and second opposing major faces the dimensions of which are substantially greater than thickness of the closure portion. The closure portion may be substantially planar or flat in shaped.

In one particular embodiment, one or more fluid exit ports may be provided in the chamber wall. A liquid release port may be provided towards the free edge of the chamber wall. A gas release port may be provided towards the base of the chamber wall.

According to a second aspect of the present invention there is provided fluid release apparatus arranged for location in a flow path between a region of relatively higher pressure within a body and a region of relatively lower pressure outside of said body, the apparatus comprising a core member having a chamber wall disposed thereabout so as to define an open chamber about said core member, and a chamber closure mounted about said core member, said closure being resiliently deformable between an at rest condition in which the closure contacts the chamber wall and an actuated condition in which the closure is spaced there-from, wherein the chamber has an aperture for receiving liquid phase fluid from the interior of said body such that upon build up of sufficient liquid in said chamber the closure moves to said actuated condition under pressure of liquid in the chamber so as to release liquid from said chamber.

Any of the preferable features described above in relation to the first aspect may also be applied to the second aspect of the invention.

BRIEF DESCRIPTION OF THE DRAWINGS

One or more practicable embodiments of the present invention are described in further detail below by way of example with reference to the accompanying drawings, of which.

DETAILED DESCRIPTION OF THE PREFERRED EMBODIMENTS

Embodiments of the invention described below provide for a compact centrifugally activated release valve for a compressor. Those embodiments allow release of liquid (typically oil or water) from a compressor drum while the engine is running whilst substantially impeding the unwanted escape of air through the device.

Figure 1:
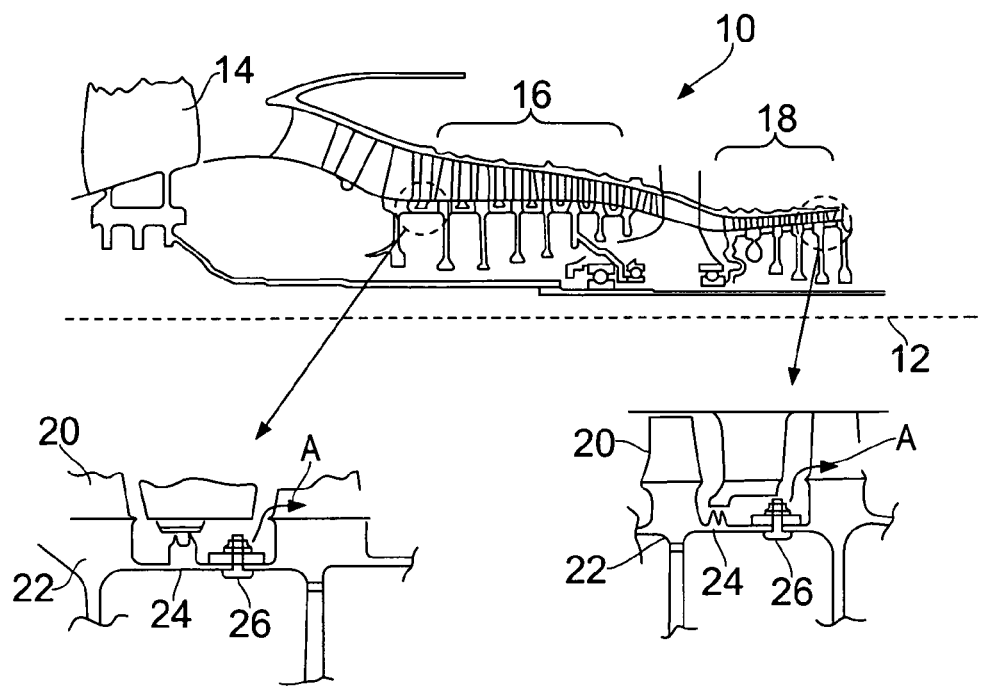
FIG. 1 shows a section view of the compressor arrangement in a generic three-shaft turbofan engine, indicating possible locations for the present invention.

Turning now to FIG. 1, there is shown a general arrangement of compressors in a ducted fan gas turbine engine, shown generally at 10. The gas turbine engine 10 has a principal and rotational axis 12. The engine 10 comprises, in axial flow series, a propulsive fan 14, an intermediate pressure compressor 16 and a high-pressure compressor 18.

The gas turbine engine 10 works in a conventional manner so that air entering the intake is accelerated by the fan 14 to produce two air flows: a first air flow into the intermediate pressure compressor 16 and a second air flow which passes through a bypass duct (not shown) to provide propulsive thrust. The intermediate pressure compressor 16 compresses the air flow directed into it before delivering that air to the high pressure compressor 18 where further compression takes place. The compressed air exhausted from the high-pressure compressor 18 is directed into combustion equipment where it is mixed with fuel and the mixture combusted.

The resultant hot combustion products then expand through, and thereby drive a series of high, intermediate and low-pressure turbines (not shown) before being exhausted to provide additional propulsive thrust.

Each of the intermediate 16 and high 18 pressure compressor rotors comprise a plurality of compressor stages, each stage having a circumferential series of compressor blades 20 mounted to a disc 22 as can be seen in the lower-left and lower-right detail sections of FIG. 1. The discs 22 are mounted in an axially spaced configuration with spacer sections 24 there-between so as to form the rotor drum. In FIG. 1 it can be seen that an embodiment 26 of the present invention is arranged to be mounted to a circumferential outer wall of the rotor drum between adjacent discs 22.

It is intended that one or more devices 26 according to the present invention may be mounted between some or all discs 22 of the intermediate or high pressure compressors. In one embodiment, a plurality of devices may be located in one or more inter-disc sections 24.

Arrows A indicate the intended flow direction of fluid exiting the compressor drum via the devices 26.

Figure 2:
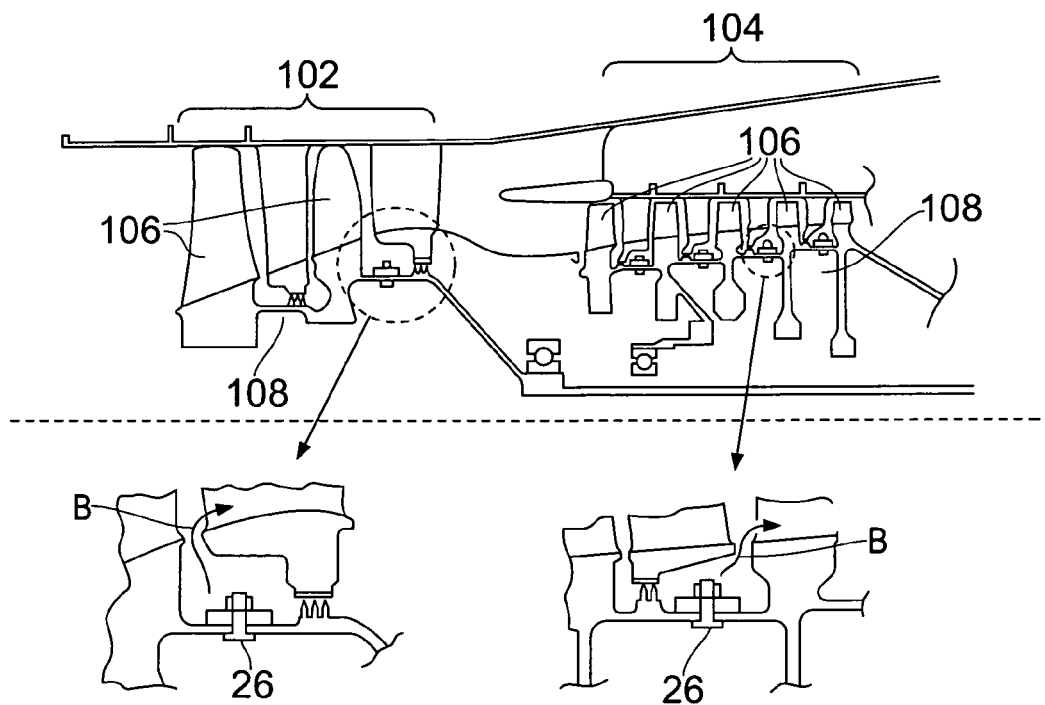
FIG. 2 shows a section view of the compressor arrangement in a generic two-shaft turbofan engine, indicating possible locations for the present invention.

Turning now to FIG. 2, there is shown a general arrangement of compressors in a two-shaft ducted fan gas turbine engine, shown generally at 100. It will be appreciated by a person skilled in the art that the bypass ratio of such an engine is lower than that of a three-shaft engine arrangement. The shape and arrangement of the low 102 and high 104 pressure compressors is different to that of FIG. 1 in order to take account of the different bypass ratio and operational requirements.

However the general principal of compressor stages 106 mounted in an axially spaced configuration with spacer sections 108 there-between so as to form the rotor drum is similar to that of FIG. 1. Accordingly a device 26 according to the present invention may also be positioned in drum sections between or adjacent compressor discs in FIG. 2 in a manner as described above in relation to FIG. 1.

It can be seen in the lower-left and lower-right detail sections of FIG. 2, the device 26 is mounted to the radially outer wall portion or 'skin' of the compressor drum. In this arrangement, arrows B indicate the intended flow direction of fluid exiting the compressor drum via the devices 26.

Figure 3:
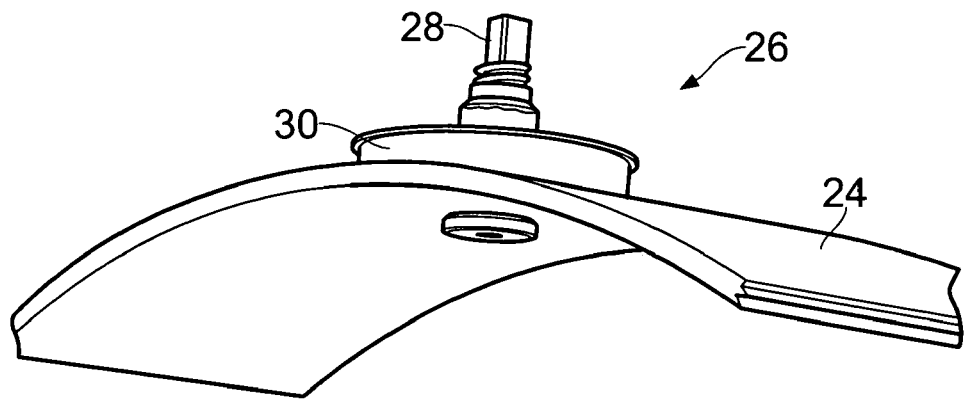
FIG. 3 shows a three-dimensional view of a fluid release device according to one embodiment of the present invention mounted in a compressor drum section.

Turning now to FIG. 3, there is shown a device 26 mounted on an outer wall section 24 of a rotating drum. The wall 24 and the device 26 are spaced from the axis of rotation of the drum.

The device generally comprises a core 28, about which is located a chamber 30 as will be described in further detail below.

Figure 4:
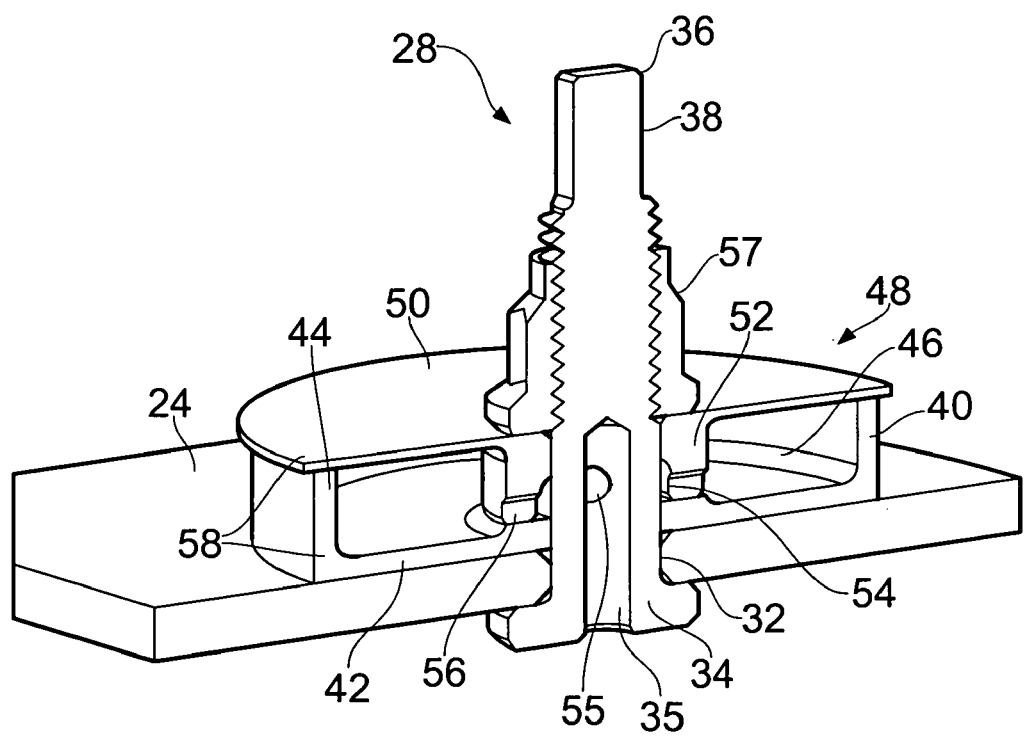
FIG. 4 shows a section view taken through the centre of the device of FIG. 3; and, FIG. 5 shows a section view taken through the centre of a fluid release device according to a further embodiment of the present invention.

In FIG. 4, it can be seen that the wall 24 to which the device 26 is mounted comprises an opening 32, in which the core member 28 is received. The core member 28 and opening 32 are correspondingly shaped such that the core fits closely within the opening 32.

The core member 28 comprises a generally cylindrical body having a head portion 34 which takes the form of a flange which may be circular in plan. The flange serves as an abutment against the wall 24 which helps to ensure correct fixing of the device 26 to the wall 24. The core member 28 extends through the wall 24 and terminates at its free end 36 a distance form the wall surface.

An anti-rotation formation 38 is provided towards the free end 36 of the core member. The formation 38 comprises an end portion of the core member which is generally rectangular in section as opposed to the generally cylindrical remainder of the core.

A passageway in the form of a bore 35 extends part-way into the body of the core member 28 from the head portion 34. The bore 35 is open ended at the head end such that it opens into the interior of the drum wall 24.

The core member is mounted such that it is in a radial orientation with respect to the rotational axis of the drum, with the head on the inside of the drum. The core may be considered to be similar to a modified bolt which may have a diameter of approximately 0.25" (6.35 mm).

A chamber wall member 40 is located about the core member 28 so as to define in part the chamber 30. The chamber wall member 40 comprises a base 42 and an upstanding wall 44 about the periphery of the base. The base is generally circular in plan and has an opening which may be located at its centre for reception of the core member 28. In this embodiment the base 42 and side wall 44 are integrally formed as a unitary chamber wall member. The wall 44 is circumferential or annular in shape and defines a cavity 46 therein. Save for the opening at its centre, the chamber wall member has a shape akin to a pan or dish.

A closure 48 is located about the core member 28 and is seated on the chamber wall 44 so as to form a face of the closed chamber 30 as shown in FIGS. 3 and 4. The closure 48 has a closure portion 50 which is disc shaped having a central opening for reception of the core member 28. The closure portion 50 is circular in plan and has a diameter slightly greater than that of the chamber wall 44 such that the closure lies over the wall.

The closure 48 in this embodiment has a supporting formation 52 disposed about the central opening in the form of an annular wall. The wall 52 is closely located about the core member 28 and is spaced from the outer periphery of the closure portion 50.

The sectional shape of the wall 52 is profiled such that it defines a cavity 54 about the core member 28 when mounted for use. Thus the cavity 54 provides an inner cavity between the inner wall 52 and the core member 28. This inner cavity 54 is generally annular and is formed in this embodiment by an inwardly-facing annular groove or recess in the inner wall 52. In other embodiments, the wall may be otherwise tapered, shaped or oriented to provide a suitable inner chamber.

The wall 52 has one or more ports therein in the form of slots 56 to allow fluid communication between the inner chamber 54 and outer chamber cavity 46. A pair of slots is provided in this embodiment, each slot being on opposing sides of the wall 52, each spaced by 180°. The height and length of the slots are greater than the width thereof. This may assist in controlling the rate of flow there-through.

The closure portion 50 and wall 52 are integrally formed. The closure portion 50 is intended to function as a disc spring during operation such that it can be deflected upon application of a force thereto in a reversible manner. Thus once the deflection force is removed, the closure portion will return to its initial undeflected state. Various options for metal disc spring materials are known in the art and will not be described in detail here for conciseness. The closure 48 may be considered to be analogous to a washer with extra thickness around the central opening, the increased thickness forming a short tube which fits closely over the core member.

The core member 28 is provided with one or more ports 55 which pass into the passage 35. The ports 55 may be radially aligned with respect to the axis of the core member and may be located towards the closed end of the passage 35. A pair of opposing ports 55 may be provided, which may be offset from the slots 56 in the closure wall 52.

The closure 48 and chamber wall member 44 are held in place against the drum wall 24 by way of a fixing member, which in this embodiment takes the form of a collar or nut 57. A portion of the core member 28 is threaded in a manner to correspond with the nut 57.

The nut clamps the assembly together. It screws on the end of the core member and bears against the outer face of the spring disc. As the nut is tightened, it provides a tension in the core member 28 which is opposed by the flange 34 so as to securely hold the chamber wall member 40 and closure 48 against the drum wall 24. For aerospace turbomachinery applications it is expected that the nut would be an AS standard 0.250" (or 6.35 mm) self locking nut although other sizes of nut and core member are also possible dependent on requirements.

In order to assemble the device according to the present invention, the core member 28 is first inserted through opening 32. The chamber wall member 40 is then located on about the core member against the drum wall 24. The closure 48 is then located about the core member 28 and slid into contact with the chamber wall member 40. The nut is then applied to the assembly. The anti-rotation feature 38 on the core member enables full tightening torque to be applied to the nut. For easy access this would best be situated at the free end of the core member but could also be incorporated at the opposing end if access is available.

When the nut is sufficiently tightened, the closure is preferably pressed into contact with the upper edge of the wall 44. Either the closure or wall may be shaped or otherwise provided with a seal-promoting formation to ensure an adequate seal is formed.

During operation, the compressor drum rotates and is maintained at an elevated pressure such that fluids contained in the drum will be forced through the passage 35 which is open to the drum interior. The head is as shallow as possible, bearing in mind its strength requirements, so that the minimum amount of liquid accumulates on the inside surface of the wall 24 prior to passage through the device.

The chamber 30 will normally be closed and will not allow any significant amount of air to pass through it.

The fluids entering the device may comprise one or more phases. Any or any combination of gas and/or liquid may enter the device through passage 35. The relevant fluids in the case of a gas turbine will typically include air, water and/or oil.

The fluids entering the device pass along passage 35 and through port(s) 55 into the inner chamber 54. The fluid then passes around the inner chamber until it passes through a slot 56 into the main chamber cavity 46. When in the main cavity 46, any liquid will tend to be forced against the inside surface of closure portion 50 under centrifugal force, whereas any gas in the chamber will tend to collect against the radially inner base 42. Thus the gas and liquid phases will tend to separate by virtue of their different densities.

The liquid phase collecting against the closure portion 50 exerts a centrifugal force thereon by virtue of the rotation of the system. Once the force acting on the closure portion exceeds the resistive force of the closure material, the closure portion will move from its at rest state (shown in FIG. 4) into a deflected state, wherein the circumferential edge of the closure is deflected away from the chamber wall 44, leaving a small gap therebetween. The gap is generally uniform about the periphery of the chamber.

Liquid can then exit the device through the gap between the chamber wall 44 and the closure 48, when deflected. As liquid escapes from the chamber, the centrifugal force on the closure will diminish until the spring force of the closure will return the closure portion 50 to its at rest state, thus preventing escape of further fluid from the device. The opening and closing of the chamber can be repeated under the action of fluid pressure to allow escape of liquid whilst substantially avoiding or minimising unwanted loss of gas from the drum interior.

It will be appreciated that the resistance of the closure 48 is important to the correct functioning of the present invention and may be tailored, for example by altering the thickness or profile thereof, in order to accommodate different applications in which the device may be used. Thus the spring characteristics of the closure 48 can be modified as required. The tensile strength of the closure is typically much greater than the force exerted on it during use such that the closure can be repeatedly deflected back and forth without yielding or permanently deforming.

The invention is scalable to suit a range of pressures, flow rates and/or rotational speeds, but except for very small or very large turbomachinery, the normal size for the invention would be designed to suit attachment to the engine with a single AS standard 0.250" self locking nut (or metric equivalent). In addition the size of the chamber can be varied to suit particular applications.

A typical value for the centrifugal force acting upon the liquid in the main chamber for a gas turbine compressor would be in the region of 15000 G. Thus a large chamber volume of only 4 CC would generate a force the equivalent of 60 Kg (assuming the liquid to be water) acting uniformly on the area of the spring disc. This factor enables the invention to be compact. The chamber would optimally be configured to be relatively large in diameter and low in depth to accommodate the necessary volume of liquid.

Figure 5:
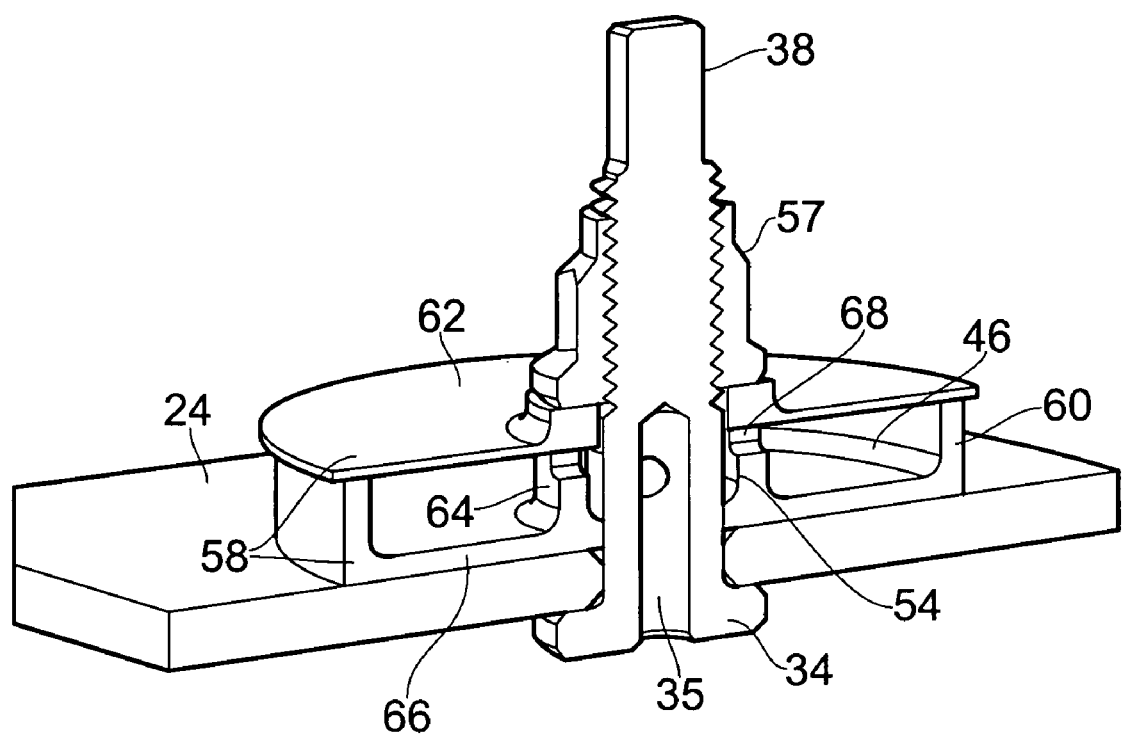

Turning now to FIG. 5, there is shown a further embodiment of the invention which is substantially the same as the embodiment of FIG. 3 save for the differences described below.

In FIG. 5, the form of the chamber wall member 60 and closure 162 are slightly different to that of FIG. 4. In particular the wall portion 52 of the closure has been omitted such that the closure 62 takes the form of a simple disc spring member which is generally planar in form. Instead of wall 52 in FIG. 4, the embodiment of FIG. 5 has a supporting formation 64 which depends from the base 66 of the chamber wall member 60. Thus the closure 62 is seated on the supporting formation 64 when the device is assembled for use. This may help reduce the manufacturing tolerance required for the closure.

The supporting formation 64 takes the form of a wall which may be integrally formed with the chamber wall member 60 and has slots 68 therein. In this embodiment, the slots are disposed adjacent the closure 62, that is at a location spaced from the base 106.

The assembly and operation of the device of FIG. 5 are the same as that for FIG. 4 and will not be repeated for conciseness. Any other features described in relation to FIG. 4 may also apply to the embodiment of FIG. 5.

According to a further embodiment, an optional feature on the invention is the inclusion of an air/liquid release ports within the large chamber 40 or 60. Such ports could be provided in the closure portion 50 or 62 or in the wall of the large chamber 44 or 100 and may take the form of one or more holes of diameter 0.5-2.0 mm. The function of such ports would be to allow gas such as air already in the chamber to be expelled when liquid is first forced in the large chamber and also to allow all liquid in the chamber to be expelled by centrifugal force even when there is insufficient liquid in the large chamber to actuate the spring disc into its 'open' state.

Whilst such a feature would allow a flow of air through the device in normal engine operation, the loss would be very small compared with conventional designs.

The preferred position for an air release hole may be at the base of the large chamber as indicated by numeral 58. This is because air already present in the large chamber will be forced radially inwards due to liquid entering the large chamber which is flung outwards. If this is the case, liquid remaining after the valve has been activated (i.e. the amount of liquid just below the quantity that will open the valve), could remain trapped in the large chamber. This will not pose a serious problem to the operation of the device, but an additional port in the disc spring or rim of the large chamber would allow this liquid to escape. Thus a suitable port may be provided towards the free end of the chamber wall 44 or in the closure 50 in addition to, or instead of, the port 58.

In a further alternative embodiment, the head portion of the core member may be modified in shape so as to provide fluid communication channels therein. This is to prevent the depth of the head portion inhibiting liquid entering the chamber of the fluid release device. Alternatively, the head portion may be unmodified and a washer having fluid channels therein, for example by way of undulations or the like, may be provided between the head and the drum wall 24.

The invention as described above can prevent significant loss of air during normal engine operation and thus improve engine efficiency whilst allowing liquid to escape when liquid is present. The invention is lightweight even if all components are manufactured from steel and is reliable due to its simplicity of design and minimised number of moving parts.

Whilst the above description of the working embodiments shown in FIGS. 1 to 5 is with reference to compressors for gas turbine engines in particular, it is to be noted that the device according to the present invention is not limited to such applications only. Instead the device of the present invention is broadly applicable to any applications in which it is desirable to release a fluid from a rotating and/or highly pressurised body. Instance in which the invention may be used could extend to other compressor or turbine arrangements, such as, for example in marine or power generation applications, other engine applications, such as internal combustion engines, separators, collectors or fluid handling equipment in other areas of industry.

The invention claimed is:

1. Fluid release apparatus comprising:
   a body having an interior and an outwardly facing wall, the body arranged for rotation in use and the interior of the body arranged to be maintained at a relatively higher pressure than the exterior of the body,
   a core member mounted to the outwardly facing wall,
   a chamber wall disposed about the core member so as to define an open chamber about said core member, and
   a chamber closure mounted about said core member, said closure being resiliently deformable between an at rest state in which the closure contacts the chamber wall and an actuated state in which the closure is spaced therefrom,
   wherein the chamber has an aperture for receiving liquid phase fluid from the interior of said rotating body such that upon build up of sufficient liquid in said chamber the closure moves to said actuated state so as to define a flow path between the interior and the exterior of the body and thereby release liquid from said rotating body under centrifugal force.

2. Fluid release apparatus according to claim 1, wherein the closure is reversibly deformable to said actuated state, such that the closure returns to its at rest state upon release of liquid from the chamber.

3. Fluid release apparatus according to claim 1, wherein the resilience of the closure is such that in the at rest condition the closure resists the force applied thereto by the pressure in the interior of the chamber but deforms into the actuated condition upon application of an additional centrifugal force thereto by liquid collected in the chamber.

4. Fluid release apparatus according to claim 1, wherein the closure takes the form of a disc spring.

5. Fluid release apparatus according to claim 1, wherein the closure is fixed to the core member, such that the closure extends radially outward from the core member.

6. Fluid release apparatus according to claim 1, wherein the closure and chamber are substantially circular in plan.

7. Fluid release apparatus according to claim 1, wherein the chamber wall is integrally formed with a chamber base, the base being locatable against an outer surface of the rotating body, wherein the chamber aperture is provided in the base.

8. Fluid release apparatus according to claim 1, wherein the core member has one or more ducts therein to allow for passage of fluid from the interior of said rotating body therethrough into said chamber.

9. Fluid release apparatus according to claim 1, wherein the chamber wall comprises a first wall and the chamber comprises a first chamber and the apparatus comprises a further chamber wall about said aperture, said further chamber wall defining a further chamber within said first chamber, wherein the further chamber is in fluid communication with said first chamber.

10. Fluid release apparatus according to claim 9, wherein the further chamber wall has one or more ports therein for communication of fluid from said further chamber to said first chamber.

11. Fluid release apparatus according to claim 9, wherein the further chamber wall is located about said core member and provides a formation for positioning of said closure relative to said core member and/or first chamber wall.

12. Fluid release apparatus according to any one of claim 9, wherein the core member has one or more ducts therein to allow for passage of fluid from the interior of said rotating body into said further chamber.

13. Fluid release apparatus according to claim 1, wherein the core member and/or closure have fixing formations thereon.

14. Fluid release apparatus according to claim 1, wherein the core member is arranged to pass through an opening in an outwardly facing wall of the rotating body, the core member having a head portion and a shaft portion, the apparatus further comprising a collar member for fixing about the shaft portion so as to allow fixing of the closure between the collar and the head portion for use.

15. Fluid release apparatus according to claim 1, wherein one or more fluid exit ports are provided in the chamber wall to allow for controlled release of fluid from said chamber when the closure is in its at rest state.

16. A gas turbine engine comprising fluid release apparatus according to claim 1.

17. A compressor for a gas turbine engine comprising fluid release apparatus according to claim 1.

* * * * *